July 16, 1935.  L. E. SOLDAN  2,008,296
MOTION CONVERTING MECHANISM
Original Filed June 20, 1927   3 Sheets-Sheet 3
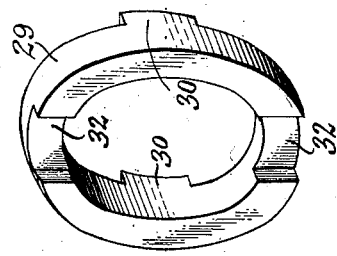
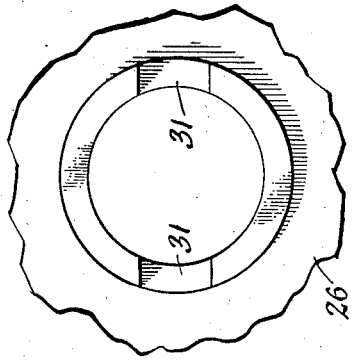
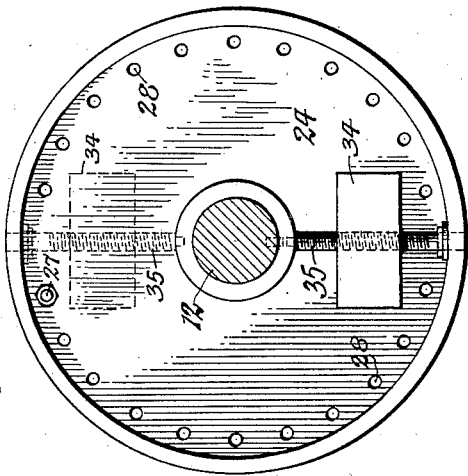
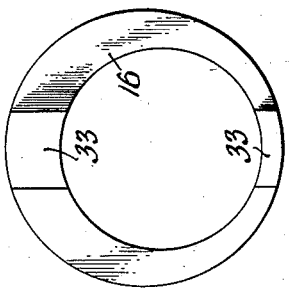
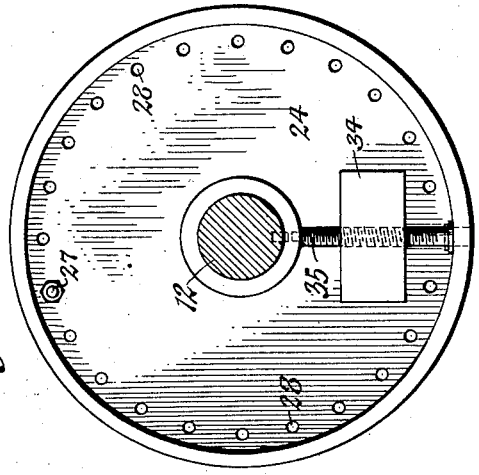
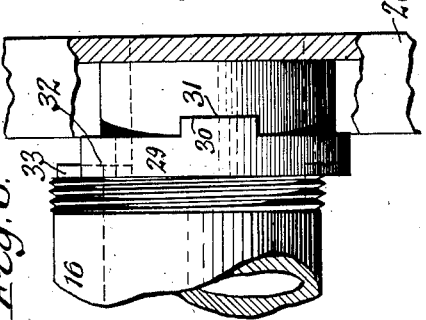
Inventor
Lewis E. Soldan
By Popp & Powers
Attorneys Patented July 16, 1935

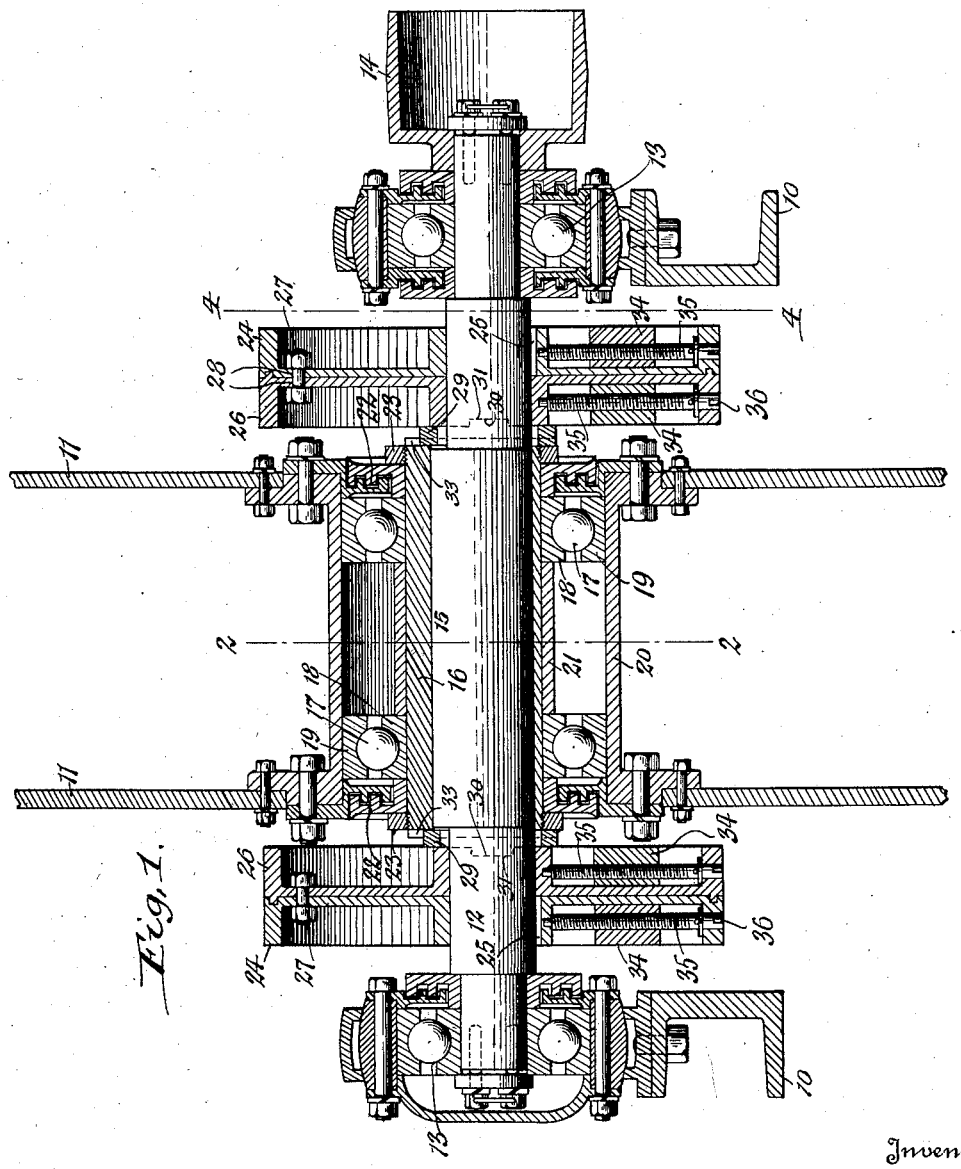

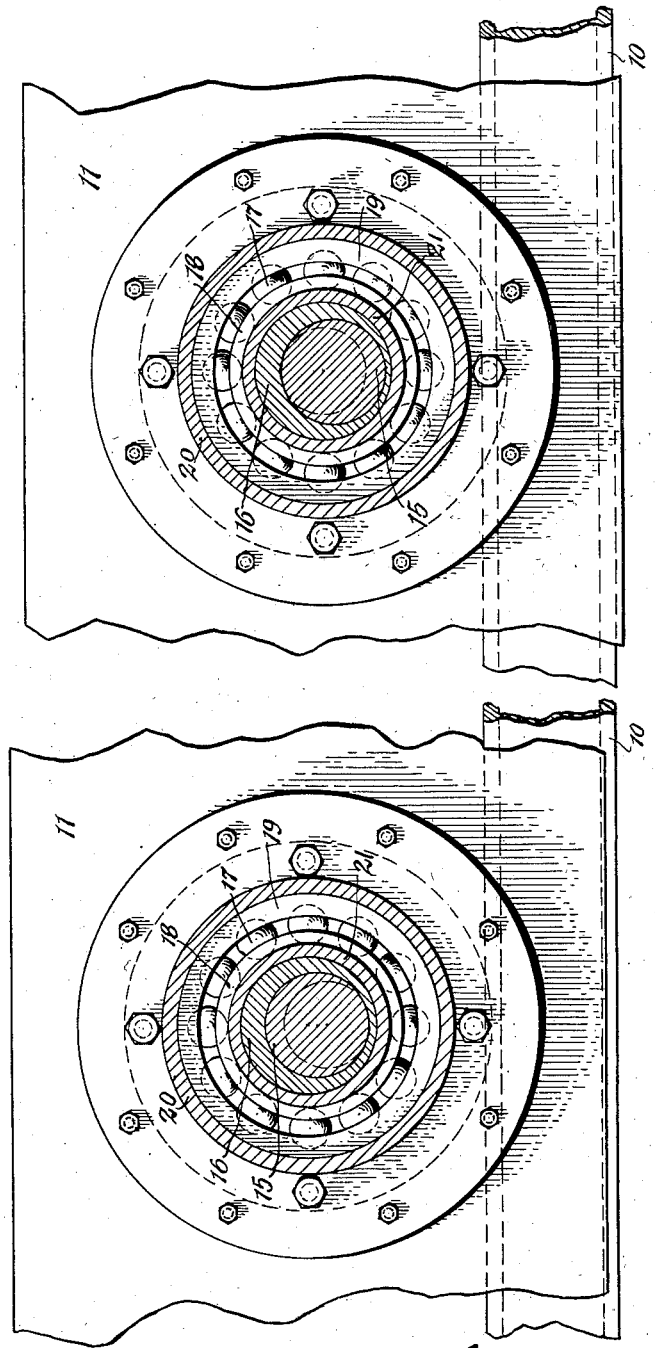

2,008,296

UNITED STATES PATENT OFFICE 2,008,296

MOTION CONVERTING MECHANISM

Lewis E. Soldan, Buffalo, N. Y., assignor to Productive Equipment Corporation, Chicago, Ill., a corporation of Illinois Application June 20, 1927, Serial No. 199,915
Renewed November 24, 1928

4 Claims. (Cl. 74—571)

This invention relates to a motion converting mechanism which contains an eccentric as part of the means for converting rotary motion into reciprocating motion for use in operating a shaking screen or similar purpose. The object is to provide a mechanism of this character which permits of readily changing the throw of the part which receives the reciprocating motion and also to so organize the mechanism that the load of the reciprocating part can be balanced to avoid vibration and wracking of the machine and maintain such balance notwithstanding any change in the throw of the reciprocating movement.

In the accompanying drawings:

Figure 1 is a vertical longitudinal section of my improved motion converting mechanism showing the same installed for shaking a screen. Figure 2 is a vertical cross section of the same taken on line 2—2, Fig. 1, and showing the adjusting eccentric in position to secure the maximum throw. Figure 3 is a similar view showing the adjusting eccentric in position for rendering the main eccentric neutral. Figure 4 is a vertical section taken on line 4—4, Fig. 1, showing the balancing weights on the same radial line. Figure 5 is a similar view showing the balancing weights shifted into diametrically opposite positions relatively to the radial line of the adjusting eccentric. Figure 6 is a fragmentary plan view of the adjusting eccentric and means for coupling the same with the adjustable balancing device. Figure 7 is an end view of the adjustable eccentric. Figure 8 is a fragmentary face view of one of the carriers of the balancing device. Figure 9 is a perspective view of an intermediate coupling ring for connecting one end of the adjustable eccentric and the balancing device.

Similar characters of reference indicate like parts in the several views of the drawings:—

Although this improved motion converting mechanism can be utilized in various kinds of machines the same in the present instance is shown in connection with a shifting or screening machine having a stationary main frame including two side bars 10, and a shaking or reciprocating shoe having two longitudinal plates or walls 11 arranged within the frame. Arranged transversely of the main frame and screen shoe is a driving shaft 12 which is journaled by means of bearings 13 on the side bars of the frame and is turned in any suitable manner, for example, by a pulley 14 secured to one end of the shaft and adapted to receive power from any available source by means of a driving belt.

Upon the central part of the driving shaft is arranged a driving eccentric 15 which is preferably, though not necessarily, formed integrally with the shaft, as shown in Figs. 2 and 3. Surrounding this driving eccentric and preferably journaled directly on the periphery thereof is a driven eccentric 16 which is capable of circumferential adjustment on the driving eccentric. A bearing is provided whereby this driven eccentric and the shoe of the shaking screen are journaled relatively to one another. In the preferred form of this bearing shown in Figs. 1, 2 and 3, the same consists of two annular rows of balls 17, inner ball races 18 mounted on the periphery of the driven eccentric and receiving the inner sides of the balls, outer ball races 19 receiving the outer sides of said balls and seated on a tubular supporting casing 20 on the screen shoe, a spacing sleeve 21 arranged on the periphery of the driven eccentric between the opposing inner sides of the inner ball races, dust excluders 22 arranged adjacent to the outer sides of the ball races and mounted on the driven eccentric and the casing, and clamping nuts 23 arranged on the ends of the driven eccentrics outside of the dust excluders.

Upon turning the driving and driven eccentrics relatively to each other so that their salient or highest parts are on the same radial line, or the same side of the axis of the driving shaft, as shown in Figs. 1 and 2, the combined effect of these eccentrics will give a throw of maximum length in the reciprocating movement of the shoe. By turning these eccentrics relatively to each other so that the salient parts of the same are on diametrically opposite sides of the axis of the driving shaft then the effect of these eccentrics results in a minimum throw of the shoe. If the offset of these two eccentrics is alike then adjustment of the same which brings their salient parts on diametrically opposite sides of the driving shaft will cause these eccentrics to neutralize one another as shown in Fig. 3, and no reciprocating effect will be transmitted to the shoe during the rotation of the driving shaft. By adjusting the eccentrics so that their salient parts occupy a circumferential position between this neutral position and the position of maximum throw it is possible to shorten or lengthen the throw of the shoe as much as desired or required for separating or treating various kinds of material or meeting different conditions.

Various means may be employed for adjusting the driving and driven eccentrics circumferentially relative to each other, those shown in the drawings having been found satisfactory in practice and constructed as follows:

The numeral 24 represents two relatively fixed heads each secured to the driving shaft between one end of the eccentrics and the adjacent shaft bearing and each having preferably the form of a wheel which is connected with the shaft by a key 25. Adjacent to the inner side of each fixed head is an adjustable head 26 of similar form which is adjustable circumferentially about the driving shaft but held in position after such adjustment. The means for holding the adjustable head in place after adjustment which are shown in the drawings comprises one or more locking bolts 27 passing through corresponding openings 28 formed in different parts circumferentially of the webs of the heads, so that by turning the heads until the same are in the required position they may be then locked together and compelled to turn in unison with the driving shaft and associated parts. The rotary motion of each adjustable head is transmitted to the adjacent end of the adjustable driven eccentric by a coupling device which preferably consists of a coupling ring 29 arranged between each end of the driven eccentric and the respective adjustable head and compelled to turn with both the driven eccentric and said head but free to slide radially relatively thereto as the position of the driven eccentric is shifted circumferentially of the driving eccentric. For this purpose the outer side of the coupling ring is provided with radial tenons or splines 30 which slidingly engage with radial grooves 31 on the hub of the adjacent adjustable head and the inner side of this ring is provided with radial grooves 32 which slidingly receive radial splines or tenons 33 on the adjacent end of the driven eccentric. By these means a rotary movement of each adjustable head is transmitted to the driven eccentric notwithstanding that they turn about different axes inasmuch as the coupling ring forms a universal connection between the adjustable head and the driven eccentric to permit of such action. After the fixed and adjustable heads are connected the driving and driven eccentrics turn as a unit. If desired, the heads and the coupling means on one side of the apparatus may be omitted but it is preferable to employ them on opposite sides of the machine for convenience in adjusting the mechanism.

Means are provided for counterbalancing the throw of the shoe in opposite directions under the action of the eccentrics and thus avoid undue vibration and wracking of the machine, said counterbalancing means being also adjustable to suit the load on the shoe. In its preferred construction this counterbalancing is effected by a weight 34 mounted on each of the heads and adjustable radially thereon by a radial screw 35 journaled at its ends on said head and working in a threaded opening in the counterweight but held against lengthwise motion. By turning this screw by a screw driver inserted in a nick 36 in its outer end the weight may be moved toward and from the axis of the respective head so as to secure a counterbalance of throw of the opposite direction by the eccentrics. The radial line of adjustment of the weights on the heads which are fixed on the driving shaft are diametrically opposite the radial line of the highest or salient part of the driving eccentric and when the driven eccentric is adjusted so that its highest or salient part is on the same radial line as the salient part of the driven eccentric, then the two counterweights of the corresponding heads are arranged side by side, as shown in Figs. 1 and 2 and the maximum counterbalancing effect is obtained from this position of the weights relative to distance of the same from the center of rotation. If the adjustable heads are now turned more or less relatively to the fixed heads then the weights on these adjustable heads are shifted circumferentially relatively to the weights of the fixed heads and a reduction in the counterbalancing effect is produced which is proportional to the change from the maximum effect which occurs when the eccentrics produce the maximum throw. This reduction in the counterbalancing effect progresses in the same measure as the eccentric throwing effect on the shoe proceeds and when the eccentrics have been turned so that the same are diametrically opposite each other, as shown in Fig. 3, and therefore neutralize each other without producing any effect whatever on the shoe, then the weights of the fixed and adjustable heads are also on diametrically opposite sides of the axis of the driving shaft, as shown by full and dotted lines in Fig. 5, thereby still maintaining the counterbalancing effect.

It will now be apparent that by means of this motion converting and counterbalancing mechanism it is possible to readily vary the throw of the elements to be reciprocated in accordance with the work to be done and that the counterbalancing weights after being once set for a certain load will be automatically maintained notwithstanding that the length of the throw is varied to suit different conditions or requirements.

I claim as my invention:

1. A motion converting mechanism comprising a rotary driving eccentric, a driven eccentric adjustable circumferentially about said driving eccentric, a reciprocating member, a bearing interposed between said driven eccentric and said reciprocating member, and adjusting means interposed between said driving and driven eccentrics, and including an adjusting head permanently connected with said driving eccentric, another adjusting head capable of circumferential adjustment relatively to said driving eccentric and adjustably connected with said first head, and a coupling ring interposed between said second head and said driven eccentric and having a spline connection with both of them so as to be compelled to turn therewith.

2. A motion converting mechanism comprising a rotary driving eccentric, a driven eccentric adjustable circumferentially about said driving eccentric, a reciprocating member, a bearing interposed between said driven eccentric and said reciprocating member, and adjusting means interposed between said driving and driven eccentrics, and including a head secured to said driving eccentric, another head circumferentially adjustable relatively to said driving eccentric, means for adjustably connecting said heads consisting of a bolt adapted to pass through different corresponding parts of said heads, and a coupling ring interposed between said driven eccentric and said second head and having a radial groove and tenon sliding connection on one side with said driven eccentric and a radial groove and tenon sliding connection on its opposite side with said second head, said radial sliding connections being arranged at right angles to each other.

3. A motion converting mechanism comprising a rotary driving eccentric, a driven eccentric adjustable circumferentially about said driving eccentric, a reciprocating member, a bearing interposed between said driven eccentric and said reciprocating member, and means for adjusting the driving and driven eccentrics circumferentially relatively to one another comprising a head which is secured to and turns with said driving eccentric, a second head which is adjustable circumferentially relatively to said first head, and a coupling member which is slidable radially in one direction on said second head and is slidable radially in another direction of said driven eccentric but compelled to turn with said second head and said driven eccentric.

4. A motion converting mechanism comprising a rotary driving eccentric, a driven eccentric adjustable circumferentially about the driving eccentric, a reciprocating member, a bearing interposed between the driven eccentric and the reciprocating member, and adjusting means interposed between the driving and driven eccentrics and including a fixed head permanently connected with the driving eccentric, an adjustable head capable of circumferential adjustment relative to the driving eccentric and adjustably connected with the fixed head, and a coupling member shiftable radially relative to the driven eccentric for preventing the driven eccentric from turning relative to the adjusting head.

LEWIS E. SOLDAN.